No. 754,004. PATENTED MAR. 8, 1904.
G. A. OLSON.
SHOCK COMPRESSOR.
APPLICATION FILED FEB. 10, 1903.
NO MODEL.
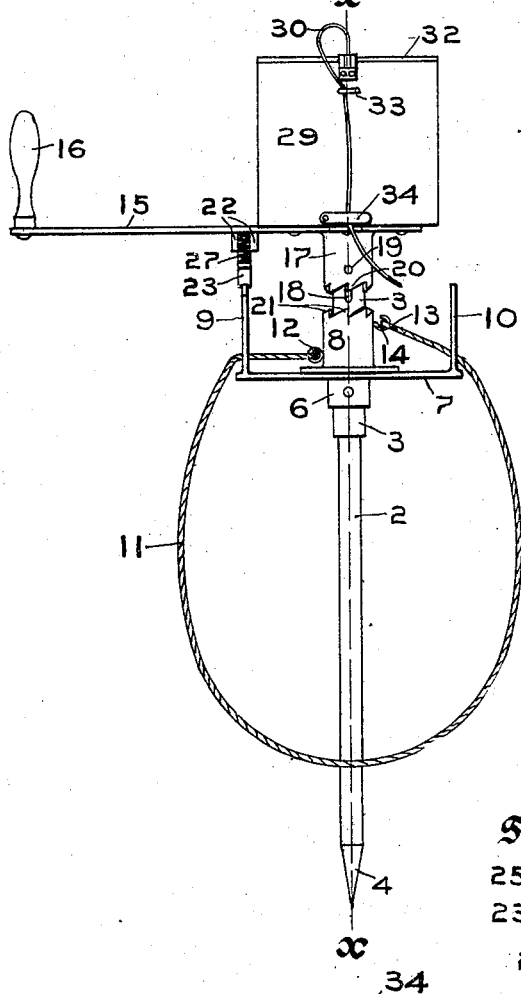
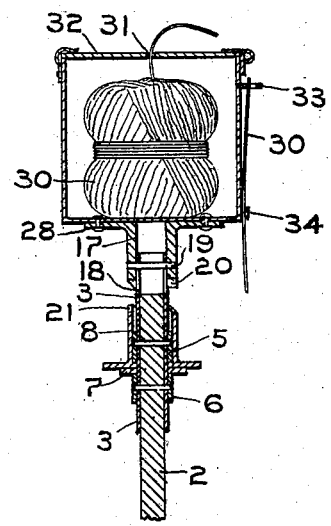
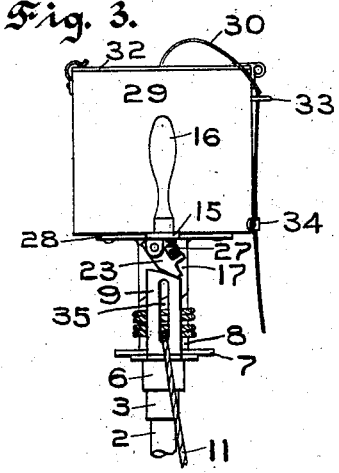
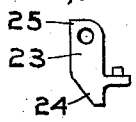
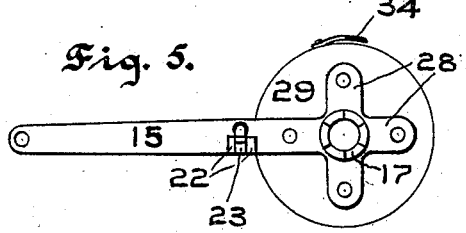
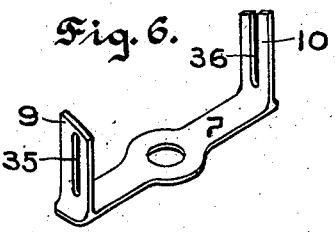
Witnesses,
W. H. Palmer
Emily F. Otis
Inventor,
Gustav A. Olson.
by Lothrop & Johnson
his Attorneys.

No. 754,004.

Patented March 8, 1904.

UNITED STATES PATENT OFFICE.

GUSTAV A. OLSON, OF ALBERT LEA, MINNESOTA.

SHOCK-COMPRESSOR.

SPECIFICATION forming part of Letters Patent No. 754,004, dated March 8, 1904.

Application filed February 10, 1903. Serial No. 142,766. (No model.)

*To all whom it may concern:*

Be it known that I, GUSTAV A. OLSON, a citizen of the United States, residing at Albert Lea, in the county of Freeborn and State of Minnesota, have invented certain new and useful Improvements in Shock-Compressors, of which the following is a specification.

My invention relates to improvements in shock-compressors, and has for its object to provide a device for conveniently and effectively compressing shocks of corn and the like before putting on the cord tie.

To this end my invention consists in the construction, combination, and arrangement of parts hereinafter described, and particularly pointed out in the claims.

In the accompanying drawings, forming part of this specification, Figure 1 is a front elevation of the device, showing the sleeve disengaged from the spool. Fig. 2 is a vertical section, taken on line $xx$ of Fig. 1, with the lower part of the thrust-rod broken away. Fig. 3 is a side elevation of the device with the thrust-pin partly broken away, showing the sleeve in engagement with the spool. Fig. 4 is a detail of the catch or dog for the guard-plate. Fig. 5 is a bottom view of the crank and cord carrier, and Fig. 6 is an isometric view of the guard-plate.

In the drawings, 2 represents a thrust-pin terminating at the top in a hollow shaft 3 and at the bottom preferably in a pointed end 4 to facilitate thrusting into the shock to be compressed. Upon the shaft 3 are secured collars 5 and 6, respectively, as best shown in Fig. 2, between which are loosely and revolubly mounted upon the shaft a guard-plate 7 and a spool 8, the spool being positioned above the guard-plate. The collars prevent longitudinal movement of spool and guard-plate upon the shaft. The guard-plate has upwardly-projecting slotted ends 9 and 10 to receive and guide the compressing-rope 11, one end of which is secured to an eye 12 upon one side of the spool 8 and the other end of which is formed with an eye 13, adapted to engage the hook 14 upon the other side of the spool.

The shaft 3 is turned by means of a crank 15, having at one end a handle 16 and at the other end a downwardly-projecting sleeve or clutch member 17, which fits loosely over the upper end of the shaft and is free to slide longitudinally thereon. To prevent the sleeve from being lifted entirely off the shaft and at the same time to allow it to slide freely thereon, the shaft is formed with a longitudinal slot 18, and a pin or bolt 19 is passed through the sleeve and also through the slot 18. The lower end of the sleeve is formed with teeth 20, adapted to engage with the coöperating teeth 21 upon the upper end of the spool when the sleeve is slid down upon the shaft by the manipulation of the crank 15 or otherwise. By then turning the crank the spool is made to revolve with the crank and the shaft 3, winding up the compressing-rope from both ends simultaneously, as shown in Fig. 3. Pivotally supported between lugs 22 upon the under side of the crank or in any other suitable way and in a position to engage the upwardly-projecting guard ends is a dog or catch 23, (best shown in Figs. 3 and 4,) having a beveled lower end 24 and a heel 25 at the top. The catch is held normally in downwardly-extending position, with its heel thrown up against the crank by suitable spring means, such as the coil-spring 27. (Shown in the drawings.) When the crank is revolved and the beveled side of the catch strikes the upwardly-projecting ends of the guard-plate, the catch will yield upon its pivot against the pressure of the spring and pass by the guard-plate ends, the tops of which may be beveled to facilitate its passage. After passing the guard-plate end the catch will be thrown back by the spring until its heel comes against the crank and holds the catch from further backward movement. In this position the dog, catching against the projecting end of the guard-plate, will act as a stop to prevent the crank and spool from turning back to allow the rope to unwind. Secured to the crank at its inner end, which may be provided with radial supporting-arms 28 for that purpose, is a box or carrier 29 for holding the binding-cord 30, as shown in Fig. 2. The cord passes through an opening 31 in the cover 32 of the box and thence through a guide 33 upon the side of the box and under a spring-strip 34 at or near the bottom of the box. The edge of the spring-strip is ground to a knife-edge, so that the cord may be cut by drawing it against the edge.

In use the lower end of the thrust-pin is thrust into the shock, and the rope 11, passing through the slot 35 in the projecting end 9 of the guard-plate, is carried around the shock and passed through the open slot 36 in the end 10 of the guard-plate, and the eye 13 at the free end of the rope is placed on the hook 14 upon the spool. The crank is pressed down to bring its sleeve 17 into clutching engagement with the spool and then revolved, thereby turning the spool to wind up the rope and compressing the shock with great force. The spool is held from turning back under the tension of the rope by the dog catching on the end of the guard-plate, which is in turn held by the rope passing through the slots in its ends. The binding-cord is then drawn from under the tension-spring, cut to the required length by drawing it against the knife-edge of the spring, and tied around the shock. The crank is then pulled out of engagement with the spool, and as the thrust-pin is withdrawn from the shock the spool turns back under the tension of the rope, which unwinds therefrom and slips off the hook.

I have made no claim to the twine-holding devices herein shown and described, for the reason that they have been claimed broadly in my application for Letters Patent filed December 29, 1903, Serial No. 186,955.

It is obvious that the details of the device may be variously modified without departing from the principle of the invention, the scope of which is defined in the claims.

Having now described my invention, what I claim as new, and desire to secure by Letters Patent, is—

1. A shock-compressor comprising, in combination, a thrust-pin, a spool carried thereby, a compressing-rope having its ends connected with the spool, and spool-engaging means also carried by the thrust-pin and adapted to be moved into engagement with the spool to cause the spool to revolve to wind up the rope, and out of engagement with the spool to allow the rope to turn the spool and unwind therefrom.

2. A shock-compressor comprising, in combination, a thrust-pin, a handle carried thereby and provided with spool-engaging means, a spool loosely mounted upon the thrust-pin near the handle and revoluble independently of the handle, and a compressing-rope having its ends connected with the spool, the handle being adapted to be moved into engagement with the spool to cause the spool to revolve to wind up the rope, and out of engagement with the spool to allow the rope to turn the spool and unwind therefrom.

3. A shock-compressor comprising, in combination, a thrust-pin, a spool loosely and revolubly mounted thereon, a compressing-rope having its ends connected with the spool, means carried by the thrust-pin for engaging the spool and causing it to revolve with the pin to wind up the rope, and means for preventing the pin and spool from turning back.

4. A shock-compressor comprising, in combination, a thrust-pin, a spool loosely and revolubly mounted thereon, a guard-plate also loosely and revolubly mounted thereon and having rope-guides at its ends, a compressing-rope having its ends connected with the spool and intermediately engaging said guides, means to revolve the spool to wind said rope, and means to prevent the spool from turning back to unwind the rope.

5. A shock-compressor comprising, in combination, a thrust-pin, a spool loosely and revolubly mounted thereon, a guard-plate also loosely and revolubly mounted thereon and having slotted ends, a compressing-rope secured at one end to the spool and having at the other end means for detachable connection with the spool and passing intermediately through the slots in the guard-plate ends, and means to revolve the spool to wind the compressing-rope thereon.

6. A shock-compressor comprising, in combination, a thrust-pin, a spool loosely and revolubly mounted thereon, a guard-plate also loosely and revolubly mounted thereon and having rope-guides at its opposite ends, a compressing-rope having its ends connected with the spool and engaging intermediately the guides of the guard-plate, means carried by the thrust-pin for engaging the spool and causing it to revolve with the pin to wind up the rope, and means for holding the pin and spool from turning back to allow the rope to unwind.

7. A shock-compressor comprising, in combination, a thrust-pin, a spool loosely and revolubly mounted thereon and formed with teeth at its upper end, a guard-plate also loosely and revolubly mounted thereon and having a guide at each end, a compressing-rope having its ends connected with the spool and intermediately engaging the guides, a sleeve mounted upon the thrust-pin above the spool and slidable longitudinally thereon, the sleeve being formed with teeth upon its lower end adapted to engage with the teeth upon the upper end of the spool, whereby the spool may be made to revolve with the thrust-pin, and means for revolving the thrust-pin and sleeve.

8. A shock-compressor comprising, in combination, a thrust-pin, a spool loosely and revolubly mounted thereon, a guard-plate also loosely and revolubly mounted thereon and having upwardly-projecting end portions, the end portions being provided with rope-guides, a compressing-rope engaged by said guides and having its ends connected with the spool, whereby it may be wound up from both ends, a crank secured to the thrust-pin near its upper end, means connected with the crank for engaging the spool and causing it to revolve with the thrust-pin, a catch having pivotal support upon the crank and adapted to engage the end portions of the guard-plate and prevent the thrust-pin and spool from turning back to allow the compressing-rope to unwind.

9. A shock-compressor comprising, in combination, a thrust-pin and means to revolve it, a spool loosely and revolubly mounted on the thrust-pin, a compressing-rope having its ends connected with the spool, and a clutch device adapted to be moved into engagement with the spool to cause it to revolve with the pin to wind up the rope, and out of engagement with the spool to allow the rope to unwind from the spool.

In testimony whereof I affix my signature in presence of two witnesses.

GUSTAV A. OLSON.

Witnesses:
T. V. KNATVOLD,
ELLA HOVE.